(12) United States Patent
Bai et al.

(10) Patent No.: US 9,998,861 B2
(45) Date of Patent: Jun. 12, 2018

(54) METHOD AND DEVICE FOR DETERMINING SERVICE AREA

(71) Applicant: Xiaomi Inc., Beijing (CN)

(72) Inventors: Zhiyong Bai, Beijing (CN); Guangjian Wang, Beijing (CN); Shuo Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/373,670

(22) Filed: Dec. 9, 2016

(65) Prior Publication Data

US 2017/0188190 A1 Jun. 29, 2017

(30) Foreign Application Priority Data

Dec. 23, 2015 (CN) .......................... 2015 1 0980529

(51) Int. Cl.
| | |
|---|---|
| *H04W 64/00* | (2009.01) |
| *H04W 4/02* | (2018.01) |
| *G06Q 10/08* | (2012.01) |
| *G06Q 50/28* | (2012.01) |
| *G06F 17/30* | (2006.01) |
| *H04L 29/08* | (2006.01) |

(Continued)

(52) U.S. Cl.
CPC ...... *H04W 4/021* (2013.01); *G06F 17/30241* (2013.01); *G06Q 10/083* (2013.01); *G06Q 50/28* (2013.01); *H04L 67/306* (2013.01); *H04L 67/42* (2013.01); *H04W 88/02* (2013.01)

(58) Field of Classification Search
CPC .......... H04J 11/0023; H04J 2011/0096; H04L 27/2663; H04L 1/0003; H04B 3/542; H04W 72/0453; H04W 72/085; H04W 72/0406; H04W 24/10; H04W 84/12
USPC ............... 455/440, 437, 456.2, 423; 370/338
See application file for complete search history.

(56) References Cited

U.S. PATENT DOCUMENTS

| | | |
|---|---|---|
| 2012/0246039 A1 | 9/2012 | Fain et al. |
| 2012/0246090 A1 | 9/2012 | Griffith et al. |

(Continued)

FOREIGN PATENT DOCUMENTS

| | | |
|---|---|---|
| CN | 101605312 A | 12/2009 |
| CN | 103139707 A | 6/2013 |

(Continued)

OTHER PUBLICATIONS

International Search Report of PCT/CN2016/087588, mailed from the State Intellectual Property Office of China dated Oct. 8, 2016.

(Continued)

*Primary Examiner* — Phuoc H Doan
(74) *Attorney, Agent, or Firm* — Finnegan, Henderson, Farabow, Garrett & Dunner LLP (57) ABSTRACT

A method for determining a service area corresponding to a provider communication account includes determining candidate communication accounts that have communicated with the provider communication account within a historical time period of a preset time length, acquiring geographical positions corresponding to the candidate communication accounts, and determining a service area corresponding to the provider communication account according to the geographical positions.

18 Claims, 4 Drawing Sheets

(51) Int. Cl.
*H04L 29/06* (2006.01)
*H04W 88/02* (2009.01)

(56) References Cited

U.S. PATENT DOCUMENTS

| | | | |
|---|---|---|---|
| 2014/0155072 A1* | 6/2014 | Hellmann | H04W 36/32 |
| | | | 455/440 |
| 2015/0088708 A1 | 3/2015 | Fain et al. | |
| 2015/0154559 A1 | 6/2015 | Barbush et al. | |
| 2015/0178778 A1 | 6/2015 | Lee et al. | |
| 2015/0227871 A1 | 8/2015 | Zeile et al. | |

FOREIGN PATENT DOCUMENTS

| | | |
|---|---|---|
| CN | 103426075 A | 12/2013 |
| CN | 104135515 A | 11/2014 |
| CN | 104320525 A | 1/2015 |
| CN | 104636905 A | 5/2015 |
| CN | 104732373 A | 6/2015 |
| CN | 104883457 A | 9/2015 |
| CN | 105657195 A | 6/2016 |
| JP | 2001-338384 A | 12/2001 |

OTHER PUBLICATIONS

Extended European Search Report of European Patent Application No. 16187523.2, from the European Patent Office, dated Dec. 22, 2016.

Office Action issued in Chinese Patent Application No. 201510980529.9, dated Feb. 24, 2018.

\* cited by examiner

METHOD AND DEVICE FOR DETERMINING SERVICE AREA

CROSS-REFERENCE TO RELATED APPLICATIONS

This application is filed based upon and claims priority to Chinese Patent Application No. 201510980529.9, filed on Dec. 23, 2015, the entire contents of which are incorporated herein by reference.

TECHNICAL FIELD

The present disclosure generally relates to computers and, more particularly, to a method and device for determining a service area corresponding to a provider communication account.

BACKGROUND

Along with development of a computer technology, terminals such as mobile phones and computers are widely used, and are provided with more and more applications with various functions. A door-to-door service type application is a common application, such as an express delivery application.

Business providers (hereinafter also referred to as "providers," which can be, for example, couriers) may register their own accounts in a service application (such as an express delivery application) and fill in their own responsible working areas, which are referred to as "service areas," and communication identifiers (such as mobile phone numbers), such that a user wishing to send an express mail knows the responsible service areas and communication identifiers of the couriers. When sending express mail, the user can select a courier whose service area is relatively close to the user.

However, since the provider fills in its own service area, the service area corresponding to a provider communication identifier may be not promptly updated when the service area of the provider is changed or when the provider quits. The user will thus see an incorrect service area corresponding to the provider communication account. As such, the correspondence between service areas and provider communication accounts is not accurate.

SUMMARY

In accordance with the present disclosure, there is provided a method for determining a service area corresponding to a provider communication account. The method includes determining candidate communication accounts that have communicated with the provider communication account within a historical time period of a preset time length, acquiring geographical positions corresponding to the candidate communication accounts, and determining a service area corresponding to the provider communication account according to the geographical positions.

Also in accordance with the present disclosure, there is provided a device for determining a service area corresponding to a provider communication account. The device includes a processor and a memory configured to store instructions that, when executed by the processor, cause the processor to determine candidate communication accounts that have communicated with the provider communication account within a historical time period of a preset time length, acquire geographical positions corresponding to the candidate communication accounts, and determine a service area corresponding to the provider communication account according to the geographical positions.

Also in accordance with the present disclosure, there is provided a non-transitory computer-readable storage medium having stored therein instructions that, when executed by a processor of a terminal, cause the terminal to determine candidate communication accounts that have communicated with the provider communication account within a historical time period of a preset time length, acquire geographical positions corresponding to the candidate communication accounts, and determine a service area corresponding to the provider communication account according to the geographical positions.

It is to be understood that both the above general description and detailed description below are exemplary and explanatory only and not restrictive of the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure. In the drawings.

The drawings clearly illustrate embodiments of the present invention, and more detailed descriptions will be made hereinafter. These drawings and text descriptions are intended not to limit the scope of concept of the present disclosure in any manner but to describe the concept of the present disclosure for those skilled in the art with reference to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

Figure 1:
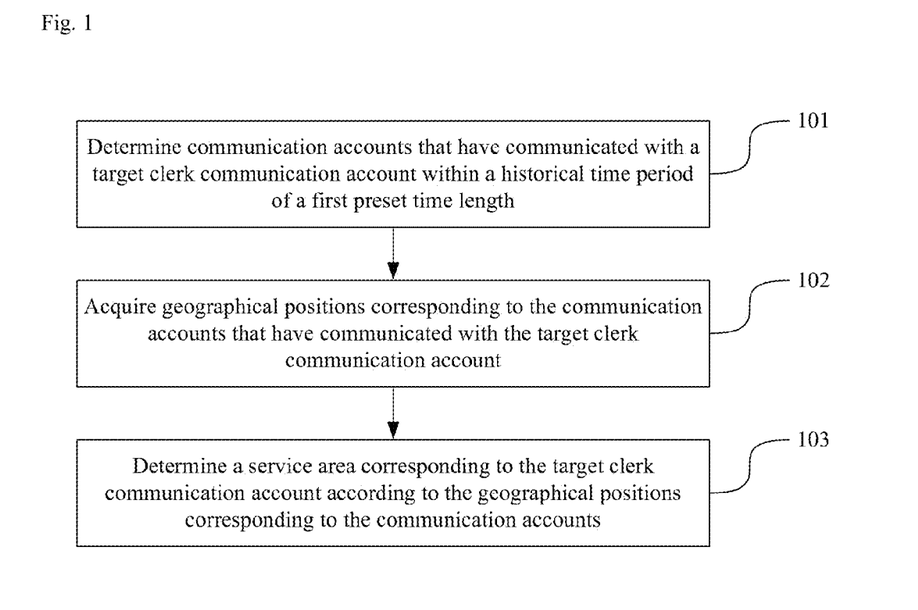
FIG. 1 is a flow chart showing a method for determining service areas corresponding to provider communication accounts according to an exemplary embodiment.

An exemplary embodiment of the present disclosure provides a method for determining a service area corresponding to a provider communication account. FIG. 1 shows a flow chart of the method. The method can be implemented in a server, where the server is configured to determine a service area of a target provider communication account, and can be a background server of an application program configured to search for a nearby provider. The server includes a processor configured to perform related processes such as determining a service area corresponding to a target provider communication account according to the geographical positions of respective communication accounts that have communicated with the target provider communication account. The server also includes a memory and a transceiver. The memory is configured to store data needed and generated during a process consistent with the present disclosure. The transceiver is configured to receive and send the data.

As shown in FIG. 1, at 101, communication accounts that have communicated with the target provider communication account within a historical time period having a first preset time length is determined. A communication account that has communicated with the target provider communication account within the historical time period is also referred to herein as a "candidate communication account." A communication account can be an account used for communication. A communication identifier of the communication account can be a mobile phone number.

In some embodiments, the communication identifier and communication records corresponding to a communication account, as well as geographical positions corresponding to communication records of the communication account can be pre-stored in the server. The geographical position corresponding to a communication record refers to the geographical position of the terminal to which the communication account is logged on during communication. In some embodiments, information of a communication account can be uploaded to the server through a cloud service started by the terminal having the communication account. The terminal can encrypt transmitted information. The server does not implement correspondence between communication accounts and user identities. The server can further determine provider communication accounts from a database containing communication identifiers of communication accounts, where a provider (business provider) can be a person providing a door-to-door service, such as a courier or a car washer.

The server can pre-store a time length, i.e., the "first preset time length." From the pre-stored communication accounts, the server determines those communication accounts whose communication records within the historical time period of the first preset time length contain the determined provider communication accounts. A communication between a communication account and a provider communication account can be initiated by the communication account or by the provider communication account. After all the pre-stored communication accounts are processed, communication accounts that have communicated with the provider communication accounts within the historical time period can be determined. For example, the server can store call records with communication identifiers, such as mobile phone numbers. A call record can include a calling number and a called number. The server can judge whether the calling numbers and called numbers contained in call records include mobile phone numbers of providers, also referred to as "provider phone numbers," to obtain the mobile phone numbers, i.e., the communication identifiers, to which the call records including the provider phone numbers belong. The server can further obtain the mobile phone numbers that have communicated with a provider phone number. In the present disclosure, any provider communication account can be referred to as a target provider communication account, and detailed descriptions are made with the target provider communication account as an example. That is, the server can determine communication accounts that have communicated with the target provider communication account within the historical time period of the first preset time length.

In some embodiments, a communication account that has communicated with the target provider communication account for a relatively short period of time can be determined. In such embodiments, determining the communication accounts that have communicated with the target provider communication account within the historical time period (101 in FIG. 1) includes determining communication accounts that have communicated with the target provider communication account for a communication time length not exceeding a second preset time length within the historical time period of the first preset time length.

In some embodiments, the server can pre-store a communication time length, e.g., the second preset time length, configured to determine a communication account that has communicated with the target provider communication account. When determining the communication accounts corresponding to the target provider communication account, the server can determine the communication accounts that have communicated with the target provider communication account for a communication time length shorter than or equal to the second preset time length within the historical time period of the first preset time length. Because a target provider usually communicates with a user for a relatively short communication time length for a business, the second preset time length can be set to be a relatively short time length, for example, one minute. Therefore, it could be more certain that the determined communication accounts have communicated with the target provider communication account for business matters. As a result, the service area corresponding to the target provider communication account can be more accurately determined.

In some embodiments, communication accounts that have communicated with the target provider communication account during business hours can be determined. In these embodiments, determining the communication accounts that have communicated with the target provider communication account within the historical time period (101 in FIG. 1) includes determining communication accounts that have communicated with the target provider communication account within a preset time range, e.g., business hours, within the historical time period of the first preset time length.

In some embodiments, a communication time range configured to determine communication accounts that have communicated with the target provider communication account can be pre-stored. When determining the communication accounts corresponding to the target provider communication account, the server can determine the communication accounts that have communicated with the target provider communication account within the historical time period of the first preset time length and for which the communications occur within the preset time range. Since the target provider usually communicates with the user for business purposes during business time, the preset time range can be set to be the business hours of the provider. In one example, the business hours of the provider are 9:00-19:00, and thus the preset time range can be set to be 9:00-19:00. Therefore, it could be more certain that the determined communication accounts have communicated with the target provider communication account for business matters. As a result, the service area corresponding to the target provider communication account can be more accurately determined.

In some embodiments, the server can determine communication accounts that have communicated with the target provider communication account based on a detection period. In such embodiments, determining the communication accounts that have communicated with the target provider communication account within the historical time period (101 in FIG. 1) includes determining communication accounts that have communicated with the target provider communication account within a preset detection period at the end of the detection period.

In some embodiments, the detection period can be preset. At the end of each preset detection period, communication accounts that have communicated with the target provider communication account within a current detection period can be determined. In one example, the detection period is preset to be 30 days. Then, at the end of every thirty-day period, the server can determine communication accounts that have communicated with the target provider communication account within the past 30 days. Thus, the server can periodically acquire communication accounts that have communicated with the target provider communication account, and can update the service area corresponding to the target provider communication account. That is, the service area information can be updated in real time.

Referring again to FIG. 1, at 102, geographical positions corresponding to the communication accounts that have communicated with the target provider communication account are acquired. That is, after determining the communication accounts that have communicated with the target provider communication account, the server can acquire the geographical positions corresponding to the communication accounts. The geographical positions can be represented by longitudes and latitudes. In addition, the geographical position corresponding to a communication account can be uploaded to the server by the user via a terminal, or can be a geographical position of the communication account at the time of the business transaction acquired by the server from a service company. For example, in a situation that the target provider is a courier, the server can acquire, from an express service company, the geographical positions of the communication accounts to receive express mails.

In some embodiments, the geographical position corresponding to a communication account can be the geographical position of the communication account during the communication between the communication account and the target provider communication account. In such embodiments, to acquire the geographical positions corresponding to the communication accounts that have communicated with the target provider communication account (102 in FIG. 1), geographical positions of the communication accounts that have communicated with the target provider communication account when they communicate with the target provider communication account are acquired.

In some embodiments, after determining the communication accounts that have communicated with the target provider communication account, the server can acquire the geographical positions of these communication accounts when communicating with the target provider communication account. Specifically, terminals having the communication accounts logged in can enable a positioning function. When the terminals enable a cloud service function, the terminals can upload communication records corresponding to current communication accounts of the terminal and the geographical position corresponding to the communication records, i.e., the geographical position during every communication with other communication accounts, to the server. The server stores the communication records and the geographical positions. Thus, after determining the communication accounts that have communicated with the target provider communication account, the server further acquires the geographical positions of communication accounts during communications between the communication accounts and the target provider communication account from the pre-stored communication records corresponding to the communication accounts and the geographical positions corresponding to the communication record. In some embodiments, the server can send a prompting message for enabling cloud service to a terminal according to a preset period. The terminal can pop up a prompting window after receiving the prompting message. A confirmation key and a cancellation key can be displayed in the prompting window for a user to perform corresponding selection according to actual situations. When receiving an instruction from the user to select the confirmation key, the terminal is triggered to upload communication records corresponding to a current communication account and geographical positions corresponding to the communication records to the server. In some embodiments, when the terminal does not pop up the prompting window, the user can also actively enable the cloud service function of the terminal to upload the communication records corresponding to the current communication account of the terminal and the geographical positions corresponding to the communication records according to actual situations.

Referring again to FIG. 1, at 103, a service area corresponding to the target provider communication account is determined according to the geographical positions corresponding to the communication accounts.

In some embodiments, the server can draw the service area corresponding to the target provider communication account according to the geographical positions corresponding to the communication accounts after acquiring the geographical positions of the communication accounts that have communicated with the target provider communication account. In some embodiments, multiple small areas can be set. When the number of geographical positions corresponding to the communication accounts in one small area is greater than a preset threshold number, the small area is determined as the service area of the target provider communication account. In some embodiments, the geographical positions at a periphery can be connected to draw the service area corresponding to the target provider communication account. In some embodiments, after determining the service areas corresponding to provider communication accounts, the server stores the service areas so that it can recommend service areas of the providers to a user to be served.

In some situations, the geographical position of a communication account at the time of communicating with the target provider communication account may not be a geographical position at which the communication account can use the service. To avoid using such geographical positions, the server can determine the service area corresponding to the target provider communication account according to geographical positions that are distributed densely. In such embodiments, determining the service area corresponding to the target provider communication account (103 in FIG. 1) includes, for each geographical position, determining distances between the geographical position and other geographical positions, deleting this geographical position if the number of other geographical positions that have a distance to this geographical position larger than a first preset threshold distance is greater than a preset threshold number, and determining the service area corresponding to the target provider communication account according to remaining geographical positions. That is, after acquiring the geographical positions corresponding to the communication accounts that have communicated with the target provider communication account, the server can delete geographical positions that are far away from most of the geographical positions and determine the service area corresponding to the target provider communication account according to remaining geographical positions.

Specifically, for each geographical position corresponding to a communication account, the server calculates the distances between this geographical position and other geographical positions, determines whether a calculated distance is longer than a preset threshold distance, also referred to herein as a "first preset threshold distance," and counts the number of distances longer than the first preset threshold distance. If the number is larger than the preset threshold number, which indicates that this geographical position is far away from most of other geographical positions, then this geographical position is deleted. Then, the server determines the service area corresponding to the target provider communication account according to the remaining geographical positions. According to these embodiments, the server can avoid using geographical positions at which services cannot be provided, and the service area corresponding to the target provider communication account can be more accurately determined.

Figure 2:
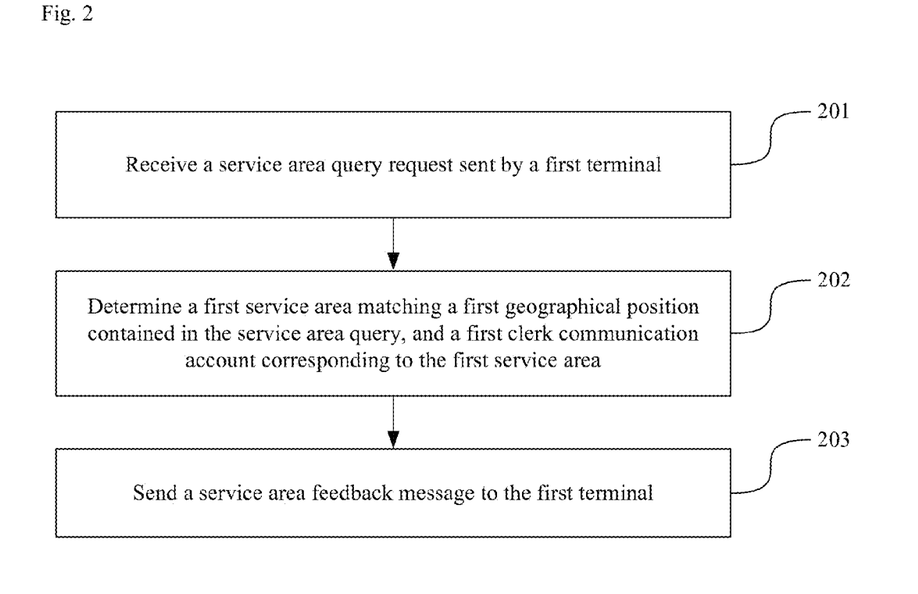
FIG. 2 is a flow chart showing a method for recommending a provider communication account according to an exemplary embodiment.

FIG. 2 is a flow chart showing an exemplary method for recommending a provider communication account consistent with the present disclosure. According to this method, the server can recommend a provider communication account matching certain conditions to a communication account according to the service areas determined by the method described above in connection with FIG. 1.

Figure 3:
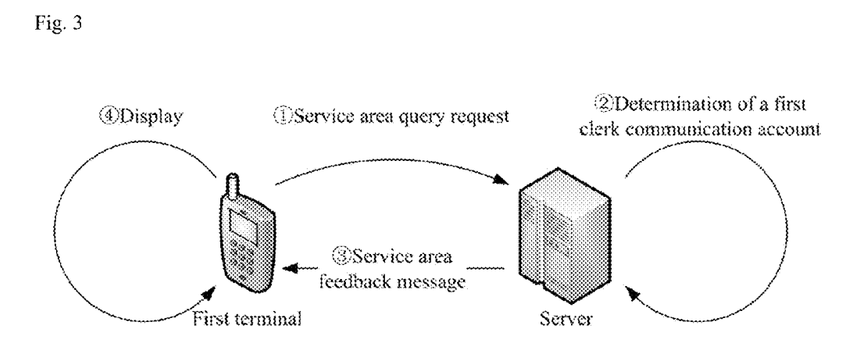
FIG. 3 is a schematic diagram of system architecture according to an exemplary embodiment.

As shown in FIG. 2, at 201, a service area query request sent by a first terminal is received. The service area query request contains information about a first geographical position, also referred to as a "terminal geographical position," of the first terminal. Specifically, the user can search for a nearby provider through the first terminal when the user needs a service. For example, when the user needs a courier to pick up an express mail, the user can acquire a communication account of a close courier from the server through a nearby provider searching function of the first terminal. As shown in FIG. 3, when the user uses the nearby provider searching function of the terminal, the first terminal is triggered to send a service area query request to the server. The service area query request contains the first geographical position of the first terminal, i.e. a geographical position of the user requesting the service. In the case of express mail delivery, the first geographical position can be the geographical position where the courier can pick up the express mail. After receiving the service area query request from the first terminal, the server parses the service area query request to acquire the first geographical position of the first terminal.

At 202, a first service area, also referred to as a "target service area," matching the first geographical position is determined from service areas corresponding to provider communication accounts, and a first provider communication account, also referred to as a "recommended provider communication account," corresponding to the first service area is determined. Specifically, after receiving the service area query request from the first terminal, the server determines the first service area matching the first geographical position from the determined service areas corresponding to the provider communication accounts, and determines the first provider communication account corresponding to the first service area according to a corresponding relationship between provider communication accounts and service areas.

In some embodiments, the first service area can be a service area including the first geographical position. In such embodiments, determining the first service area (202 in FIG. 2) includes determining a service area to which the first geographical position belongs as the first service area. Specifically, after receiving the service area query request from the first terminal, the server determines whether there is a service area including the first geographical position exists in the determined service areas corresponding to the provider communication accounts. If the service area to which the first geographical position belongs exists, the server determines that service area as the first service area, and further determines the first provider communication account corresponding to the first service area according to the corresponding relationship between the provider communication accounts and the service areas.

In some embodiments, the first service area can be a service area relatively close to the first geographical position. In such embodiments, determining the first service area and the first provider communication account (202 in FIG. 2) includes, if the service area to which the first geographical position belongs does not exist in the determined service areas corresponding to the provider communication accounts, determining a service area having a minimum distance to the first geographical position not exceeding a second preset threshold distance as the first service area, and determining the first provider communication account corresponding to the first service area. Specifically, in a situation that there is no service area that includes the first geographical position, that is, the service area to which the first geographical position belongs does not exist, the server calculates minimum distances between the first geographical position and the service areas corresponding to the provider communication accounts, determines the service area that has a minimum distance shorter than or equal to the second preset threshold distance as the first service area, and determines the first provider communication account corresponding to the first service area according to the corresponding relationship between the provider communication accounts and the service areas.

Figure 4:
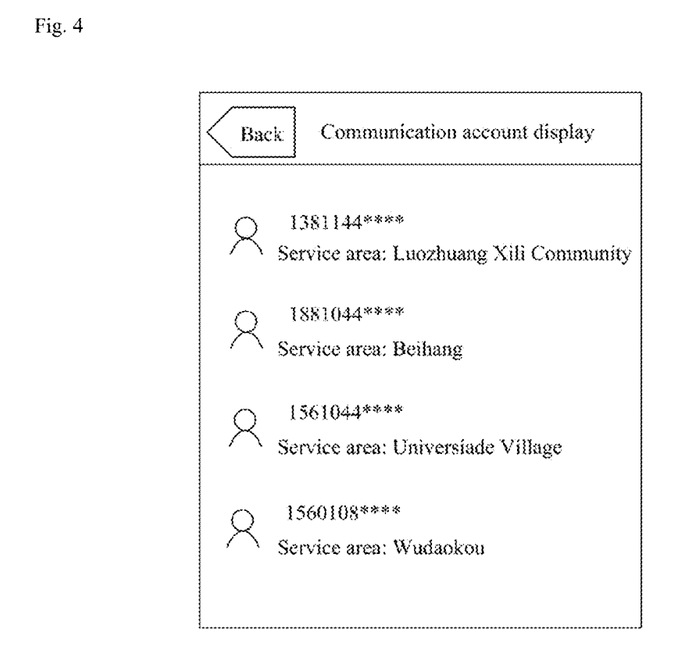
FIG. 4 is a schematic diagram of a display interface according to an exemplary embodiment.

At 203, a service area feedback message is sent to the first terminal. The service area feedback message contains the first provider communication account. Specifically, after determining the first provider communication account, the server sends the service area feedback message to the first terminal. The service area feedback message contains the first provider communication account. In some embodiments, there can be more than one first provider communication account. In some embodiments, if there are too many first provider communication accounts, the server can select one or a preset number of provider communication accounts from the first provider communication accounts and send to the first terminal. The service area feedback message can further contain the service area corresponding to the first provider communication account. When receiving the service area feedback message from the server, the first terminal can pop up a communication account display window. A communication identifier of the first provider communication account can be displayed in the window. In the scenario that the service area feedback message contains the service area corresponding to the first provider communication account, the service area corresponding to the first provider communication account can also be displayed in the communication account display window. Text description about the service area can also be displayed. A user can click the displayed service area to trigger the terminal to pop up a map window, with an area including the corresponding service area displayed in the map window, and the corresponding service area marked for the user to view. For example, as shown in FIG. 4, mobile phone numbers and corresponding service areas of the providers, who are couriers, are displayed in the communication account display window.

Figure 5:
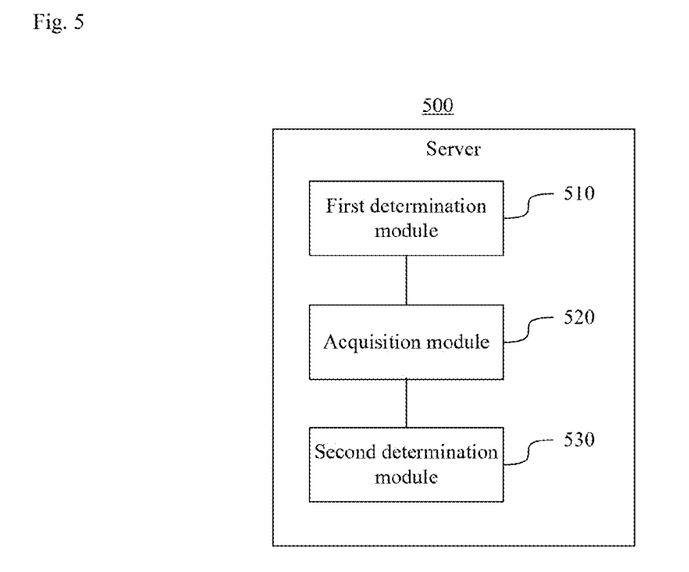
FIG. 5 is a schematic diagram of a device for determining service areas corresponding to provider communication accounts according to an exemplary embodiment.

FIG. 5 schematically shows an exemplary device 500 for determining service areas corresponding to provider communication accounts consistent with the present disclosure. The device 500 can be a server. As shown in FIG. 5, the device 500 includes a first determination module 510 configured to determine communication accounts that have communicated with a target provider communication account within a historical time period of a first preset time length, an acquisition module 520 configured to acquire geographical positions corresponding to the communication accounts that have communicated with the target provider communication account, and a second determination module 530 configured to determine service areas corresponding to the target provider communication account according to the geographical positions corresponding to the communication accounts.

In some embodiments, the first determination module 510 is configured to determine communication accounts that have communicated with the target provider communication account for a communication time length not exceeding a second preset time length within the historical time period of the first preset time length.

In some embodiments, the first determination module 510 is configured to determine communication accounts that have communicated with the target provider communication account within a preset time range within the historical time period of the first preset time length.

In some embodiments, the first determination module 510 is configured to determine communication accounts that have communicated with the target provider communication account within current preset detection period at the end of the detection period.

In some embodiments, the acquisition module 520 is configured to acquire the geographical positions of the communication accounts that have communicated with the target provider communication account during communication between the communication accounts and the target provider communication account.

Figure 6:
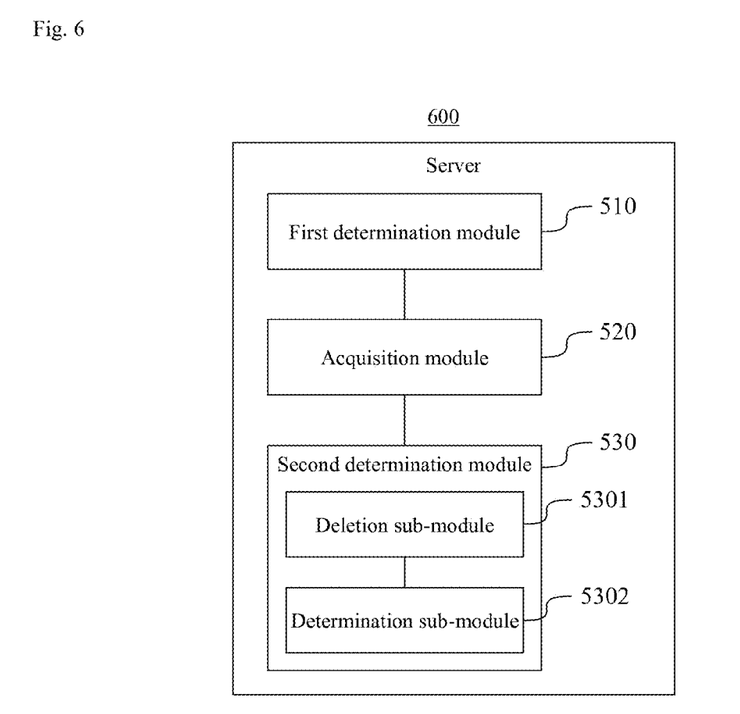
FIG. 6 is a schematic diagram of a device for determining service areas corresponding to provider communication accounts according to another exemplary embodiment.

FIG. 6 schematically shows another exemplary device 600, which can be a server, consistent with the present disclosure. The device 600 is similar to the device 500, except that in the device 600, the second determination module 530 includes a deletion sub-module 5301 and a determination sub-module 5302. The deletion sub-module 5301 is configured to determine distances between a geographical position and other geographical positions, and delete that geographical position if the number of other geographical positions that have a distance to that geographical position larger than a first preset threshold distance is greater than a preset threshold number. The determination sub-module 5302 is configured to determine the service areas corresponding to the target provider communication accounts according to the remaining geographical positions after the deletion processing is performed on the geographical positions.

Figure 7:
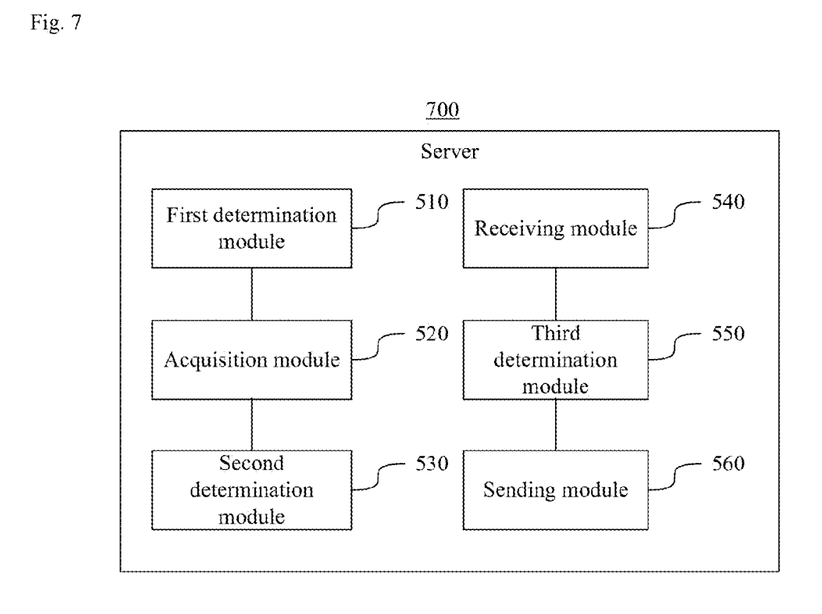
FIG. 7 is a schematic diagram of a device for determining service areas corresponding to provider communication accounts according to another exemplary embodiment.

FIG. 7 schematically shows another exemplary device 700, which can be a server, consistent with the present disclosure. The device 700 is similar to the device 500, except that the device 700 further includes a receiving module 540, a third determination module 550, and a sending module 560. The receiving module 540 is configured to receive a service area query request from a first terminal. The service area query request contains information about a first geographical position of the first terminal. The third determination module 550 is configured to determine a first service area matching the first geographical position from service areas corresponding to the provider communication accounts and determine a first provider communication account corresponding to the first service area. The sending module 560 is configured to send a service area feedback message to the first terminal. The service area feedback message contains the first provider communication account.

In some embodiments, the third determination module 550 is further configured to determine a service area to which the first geographical position belongs as the first service area and determine the first provider communication account corresponding to the first service area.

In some embodiments, the third determination module 550 is further configured to, if the service area to which the first geographical position belongs does not exist in the service areas corresponding to the provider communication accounts, determine a service area having a minimum distance to the first geographical position not exceeding a second preset threshold distance as the first service area, and determine the first provider communication account corresponding to the first service area.

Operations of individual modules in the above-described exemplary devices are similar to the exemplary methods described above, and thus the details thereof are omitted here.

Figure 8:
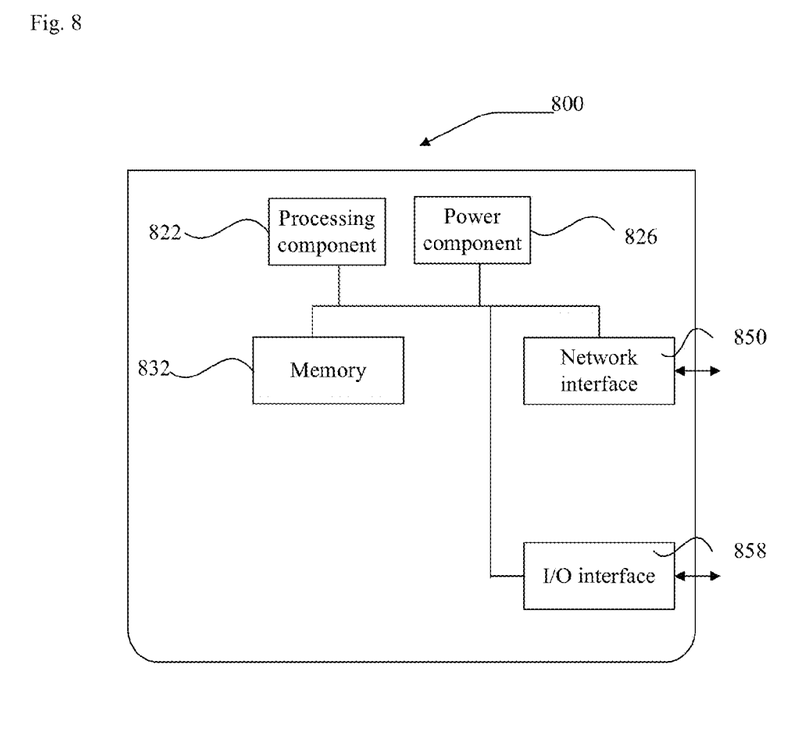
FIG. 8 is a structure diagram of a server according to an exemplary embodiment.

The above-described modules/sub-modules are examples for explaining the present disclosure. Functions of such modules/sub-modules can be performed by different modules/sub-modules, i.e., a device consistent with the present disclosure can include hardware modules/sub-modules different from those described above, each being configured to perform part or all functions of one or more of the above-described modules/sub-modules. FIG. 8 is a block diagram of an exemplary device 800 for determining service areas corresponding to provider communication accounts consistent with the present disclosure. For example, the device 800 can be implemented as a server. Referring to FIG. 8, the device 800 includes a processing component 822, which further includes one or more processors, and a memory resource represented by a memory 832, which is configured to store instructions executable by the processing component 822, for example, application programs. The application programs stored in the memory 832 can include one or more sets of instructions. In addition, the processing component 822 is configured to execute the instructions to perform a method consistent with the present disclosure, such as one of the above-described exemplary methods.

The device 800 further includes a power component 826 configured to execute power management of the device 800, a wired or wireless network interface 850 configured to connect the device 800 to a network, and an Input/Output (I/O) interface 858. The device 800 can be operated on the basis of an operating system stored in the memory 832, such as Windows Server™, Mac OS X™, Unix™, Linux™ or FreeBSD™.

The device 800 can include a memory included in the memory 832, and at least one program, wherein the at least one program is stored in the memory, and the at least one processor, included in the processing component 822, is configured to execute the at least one program to perform a method consistent with the disclosure, such as one of the above-described exemplary methods.

According to the present disclosure, communication accounts that have communicated with a target provider communication account within a historical time period having a first preset time length is determined, geographical positions corresponding to the communication accounts that have communicated with the target provider communication account is acquired, and service areas corresponding to the target provider communication accounts are determined according to the geographical positions corresponding to the communication accounts. A service area of a target provider can be determined by an apparatus such as a server, and the target provider does not need to manually modify its service area. As such, the accuracy of determining the service area corresponding to a provider communication account can be improved.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. The specification and examples should be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. The scope of the present disclosure shall only be limited by the appended claims.

What is claimed is:

1. A method for determining a service area corresponding to a provider communication account, comprising:
   determining candidate communication accounts that have communicated with the provider communication account within a historical time period of a preset time length;
   acquiring geographical positions corresponding to the candidate communication accounts;
   determining a service area corresponding to the provider communication account according to the geographical positions; and
   recommending the provider communication account to a communication account, according to the determined service area corresponding to the provider communication account;
   wherein determining the service area corresponding to the provider communication account includes:
      for a selected geographical position selected from the acquired geographical positions:
         determining distances between the selected geographical position and other geographical positions, and
         deleting, if a number of other geographical positions that have a distance to the selected geographical position larger than a preset threshold distance is greater than a preset threshold number, the selected geographical position; and
      determining the service area according to remaining geographical positions after the deleting is performed.

2. The method according to claim 1, wherein:
   the preset time length is a first preset time length, and
   determining the candidate communication accounts includes determining communication accounts that have communicated with the provider communication account for a communication time length not exceeding a second preset time length within the historical time period as the candidate communication accounts.

3. The method according to claim 1, wherein determining the candidate communication accounts includes:
   determining communication accounts that have communicated with the provider communication account within a preset time range within the historical time period as the candidate communication accounts.

4. The method according to claim 1, wherein determining the candidate communication accounts includes:
   determining communication accounts that have communicated with the provider communication account within a detection period as the candidate communication accounts at an end of the detection period.

5. The method according to claim 1, wherein acquiring the geographical positions includes:
   acquiring the geographical positions of the candidate communication accounts during communication between the candidate communication accounts and the provider communication account.

6. The method according to claim 1, wherein the recommending of the provider communication account to a communication account, according to the determined service area corresponding to the provider communication account comprises:
   receiving a service area query request from a terminal, the service area query request containing information about a terminal geographical position of the terminal;
   determining a target service area matching the terminal geographical position from stored service areas corresponding to provider communication accounts;
   determining a recommended provider communication account corresponding to the target service area; and
   sending a service area feedback message to the terminal, the service area feedback message containing the recommended provider communication account.

7. The method according to claim 6, wherein determining the target service area includes:
   determining a service area to which the terminal geographical position belongs as the target service area.

8. The method according to claim 6, wherein determining the target service area includes:
   determining a service area that has a minimum distance to the terminal geographical position not exceeding a preset threshold distance as the target service area.

9. The method according to claim 1, wherein the service area corresponding to the provider communication account is a geographical area covered by a door-to-door service provided by the provider communication account to other communication accounts.

10. A device for determining a service area corresponding to a provider communication account, comprising:
    a processor; and a memory configured to store instructions that, when executed by the processor, cause the processor to:
    determine candidate communication accounts that have communicated with the provider communication account within a historical time period of a preset time length;
    acquire geographical positions corresponding to the candidate communication accounts;
    determine a service area corresponding to the provider communication account according to the geographical positions; and
    recommend the provider communication account to a communication account, according to the determined service area corresponding to the provider communication account;
    wherein in determining the service area corresponding to the provider communication account according to the geographical positions, the instructions further cause the processor to:
        for a selected geographical position selected from the acquired geographical positions:
            determine distances between the selected geographical position and other geographical positions, and
            delete, if a number of other geographical positions that have a distance to the selected geographical position larger than a preset threshold distance is greater than a preset threshold number, the selected geographical position; and
        determine the service area according to remaining geographical positions after the deleting is performed.

11. The device according to claim 10, wherein:
the preset time length is a first preset time length, and
the instructions further cause processor to determine communication accounts that have communicated with the provider communication account for a communication time length not exceeding a second preset time length within the historical time period as the candidate communication accounts.

12. The device according to claim 10, wherein the instructions further cause the processor to:
    determine communication accounts that have communicated with the provider communication account within a preset time range within the historical time period as the candidate communication accounts.

13. The device according to claim 10, wherein the instructions further cause the processor to:
    determine communication accounts that have communicated with the provider communication account within a detection period as the candidate communication accounts at an end of the detection period.

14. The device according to claim 10, wherein the instructions further cause the processor to:
    acquire the geographical positions of the candidate communication accounts during communication between the candidate communication accounts and the provider communication account.

15. The device according to claim 10, wherein the instructions further cause the processor to:
    receive a service area query request from a terminal, the service area query request containing information about a terminal geographical position of the terminal;
    determine a target service area matching the terminal geographical position from stored service areas corresponding to provider communication accounts;
    determine a recommended provider communication account corresponding to the target service area; and
    send a service area feedback message to the terminal, the service area feedback message containing the recommended provider communication account.

16. The device according to claim 15, wherein the instructions further cause the processor to:
    determine a service area to which the terminal geographical position belongs as the target service area.

17. The device according to claim 15, wherein the instructions further cause the processor to:
    determine a service area that has a minimum distance to the terminal geographical position not exceeding a preset threshold distance as the target service area.

18. A non-transitory computer-readable storage medium having stored therein instructions that, when executed by a processor of a terminal, cause the terminal to:
    determine candidate communication accounts that have communicated with the provider communication account within a historical time period of a preset time length;
    acquire geographical positions corresponding to the candidate communication accounts;
    determine a service area corresponding to the provider communication account according to the geographical positions; and
    recommend the provider communication account to a communication account, according to the determined service area corresponding to the provider communication account;
    wherein in determining the service area corresponding to the provider communication account according to the geographical positions, the instructions further cause the terminal to:
        for a selected geographical position selected from the acquired geographical positions:
            determine distances between the selected geographical position and other geographical positions, and
            delete, if a number of other geographical positions that have a distance to the selected geographical position larger than a preset threshold distance is greater than a preset threshold number, the selected geographical position; and
        determine the service area according to remaining geographical positions after the deleting is performed.

* * * * *